United States Patent [19]

White

[11] Patent Number: 4,981,174

[45] Date of Patent: Jan. 1, 1991

[54] LEAKPROOF STUFFING BOX WITH EXTERNAL LUBRICATION FOR POLISH ROD

[76] Inventor: Orvel O. White, 401 Shasta St., Taft, Calif. 93208

[21] Appl. No.: 480,136

[22] Filed: Feb. 14, 1990

[51] Int. Cl.$^5$ .............................................. E21B 33/03
[52] U.S. Cl. ...................................... 166/84; 166/82; 277/59; 277/72 R; 277/79; 277/206 R
[58] Field of Search ............. 166/75.1, 81, 82, 84, 166/88; 277/59, 72, 72 FM, 74, 75, 79, 194, 206 R

[56] References Cited

U.S. PATENT DOCUMENTS

| | | | |
|---|---|---|---|
| 1,467,877 | 9/1923 | Rea | 166/84 |
| 2,380,189 | 7/1945 | Ratigan. | |
| 2,674,474 | 4/1954 | Lister | 166/84 |
| 2,743,122 | 4/1956 | Ratigan | 166/82 |
| 3,353,606 | 11/1967 | Dyer | 166/84 |
| 3,362,345 | 1/1968 | Sparger | 277/72 |
| 3,939,910 | 2/1976 | Bruce | 166/84 |
| 3,967,678 | 7/1976 | Blackwell | 166/84 |
| 4,384,726 | 5/1983 | Meyer | 277/59 |
| 4,886,241 | 12/1989 | Davis et al. | 277/59 |

Primary Examiner—Bruce M. Kisliuk
Attorney, Agent, or Firm—Jack C. Munro

[57] ABSTRACT

A stuffing box for an oil well pump which utilizes a separate lubricating fluid chamber for the polish rod rather than using the crude oil that is being pumped as the lubricating fluid.

1 Claim, 2 Drawing Sheets

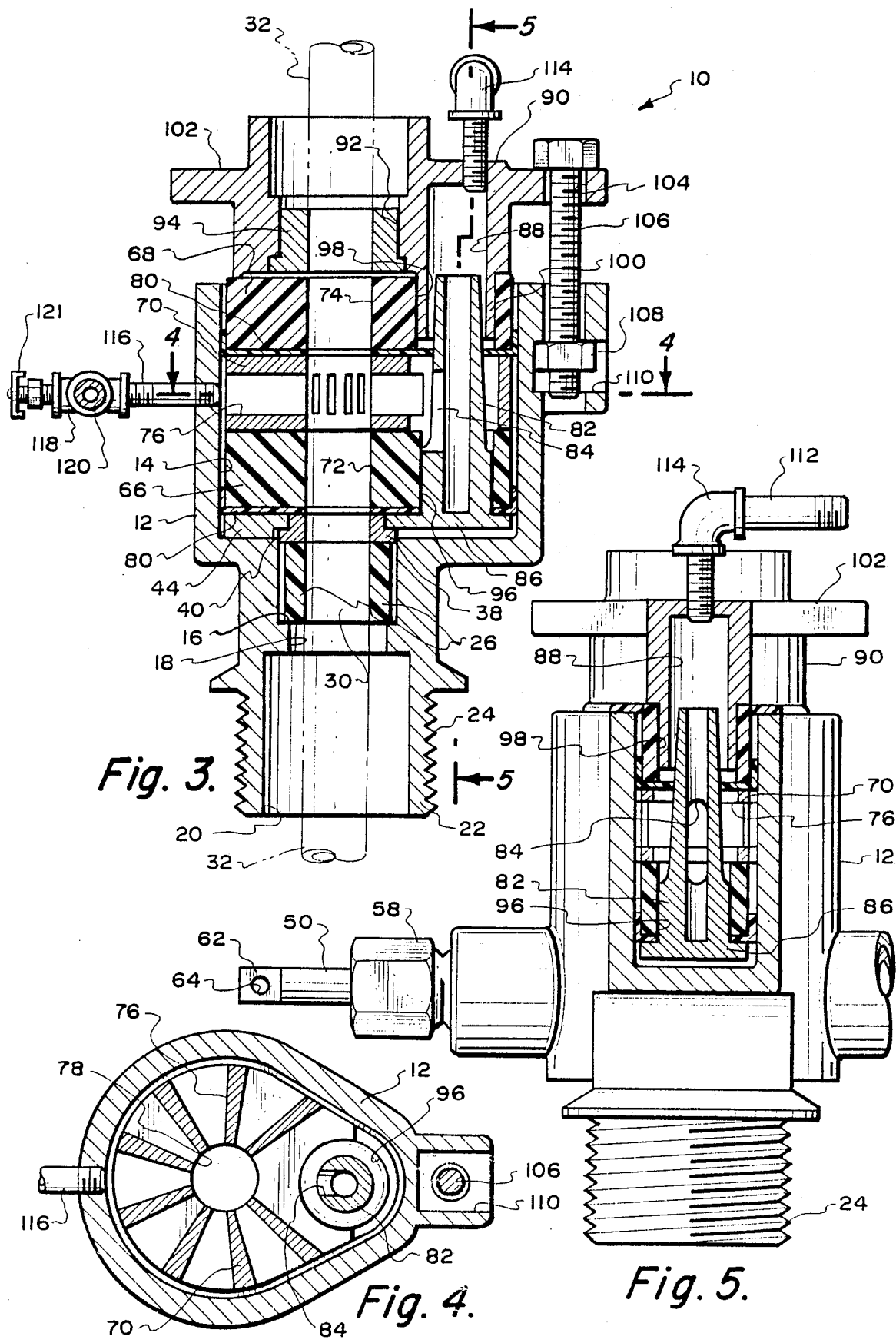

LEAKPROOF STUFFING BOX WITH EXTERNAL LUBRICATION FOR POLISH ROD

BACKGROUND OF THE INVENTION

The field of this invention relates to a stuffing box which is used in connection with an oil well pumping system. The stuffing box is utilized at the top of the oil well pumping system and is designed to prevent leakage of the oil that is being pumped exteriorly of the oil well pumping system.

Oil wells are produced by using drilling rig. After the well is obtained, the drilling rig is removed and a wellhead of a pumping system is installed at the ground whose purpose is to pump the oil from the oil well. Pumped oil is caused to flow through a storage reservoir after being removed from the well.

Within the wellhead there is utilized a rod which is lineally moved in a reciprocating manner which is part of the pumping operation. This rod, called a polish rod, extends from the wellhead into the ambient. There has to be a seal between this rod and the wellhead so that the pumped crude oil will not flow uncontrollably from the wellhead to be deposited on the ground around the wellhead. Not only is this oil lost (not usable) but also environmental laws prevent such contamination of the environment. Also, accumulation of oil around a wellhead results in an exceedingly unsightly appearance.

In the past, what has been utilized to provide the seal between the polish rod and the wellhead is referred to as a stuffing box. To make a stuffing box preventing leakage of oil from the wellhead is difficult because the polish rod is continuously moving relative to the stuffing box and wear is a constant problem. This wear results in leakage. Generally, it only takes a few days of operation of the polish rod for leakage to occur.

It is common for the stuffing box to utilize the crude oil itself as the lubricant to decrease the friction involved in moving of the polish rod in the stuffing box. However, this crude oil inherently obtains a substantial amount of contaminants and these contaminants are abrasive. Therefore, this type of lubrication of the polish rod is at best, poor.

SUMMARY OF THE INVENTION

The primary objective of the present invention is to construct a stuffing box wherein the lubrication of the polish rod is accomplished by supplying of a refined lubricant into the stuffing box thereby eliminating lubricating of the polish rod by the crude oil that is being pumped.

Another objective of the present invention is to construct a stuffing box where wear between the stuffing box and the polish rod is substantially diminished thereby significantly extending the length of time that the polish rod may be operated without resulting in leakage of crude oil exteriorly of the stuffing box.

The stuffing box of the present invention is basically constructed similar to conventional stuffing boxes. The prior art stuffing boxes include a packing gland assembly. However, within the present invention, the packing gland assembly includes a seal a arrangement which closes the packing gland assembly with respect to the ambient and also from the crude oil pumping chamber. Within this packing gland assembly is located a lubricating oil storage chamber. Connecting with this storage chamber is a series of fluid fittings which are mounted on the stuffing box housing. Lubricating oil is to be supplied from an outside source through the fittings into this storage chamber and is to be continuously cycled therethrough. The polish rod is in continuous connection with this lubricating oil storage chamber so the polish rod is constantly being coated with the lubricating oil.

BRIEF DESCRIPTION OF THE DRAWINGS

FIG. 3 is a cross-sectional view taken along line 3—3 of FIG. 2 with the direction of FIG. 3 being transverse to the cross-section of FIG. 2;

FIG. 4 is a horizontal cross-sectional view through the stuffing box of the present invention taken along line 4—4 of FIG. 3; and FIG. 5 is vertical cross-sectional view through a portion of the stuffing box of the present invention taken along line 5—5 of FIG. 3.

DETAILED DESCRIPTION OF THE SHOWN EMBODIMENT

Figure 1:
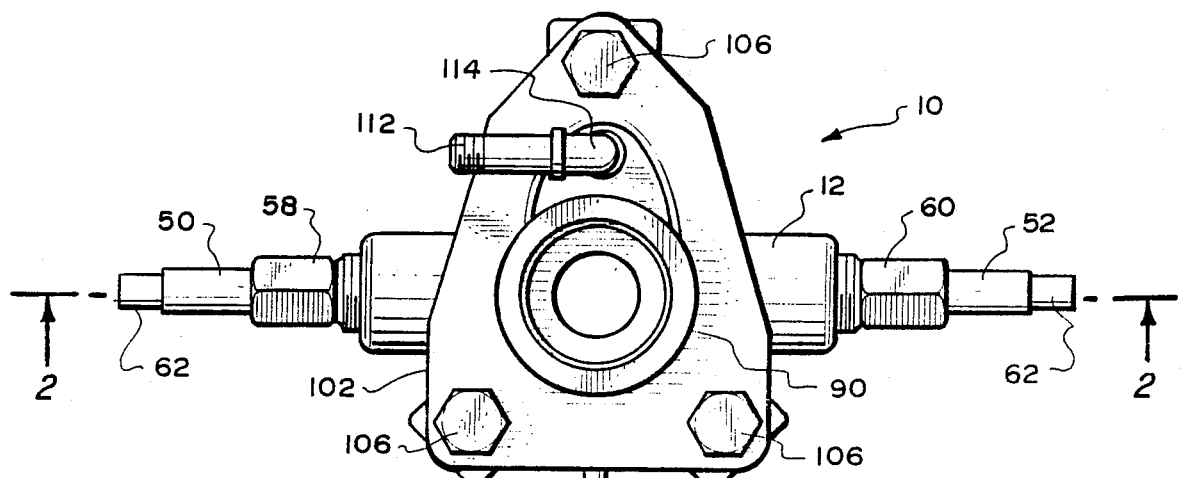
FIG. 1 is a top plan view of the stuffing box of the present invention.

Referring particularly to the drawings, there is shown the stuffing box 10 of this invention. Stuffing box 10 includes a main housing 12 which has an internal chamber 14. The lower end of the internal chamber 14 is formed into a ledge 16. Centrally located within ledge 16 is an opening 18. Opening 18 connects with passage 20. Passage 20 is formed within enlarged nipple section 22. The nipple section 22 has an exterior surface which is formed into a series of screw threads 24.

Resting on the ledge 16 are a pair of identically shaped arcuate sealing members 26 and 28. Sealing members 26 and 28 are to be located in a facing relationship to each other. Each sealing member 26 and 28 is to include an inwardly located substantially half-circular recess 30. These recesses 30 cooperate together to form a substantially through opening. Within this opening 30 is to be lineally movably mounted a rod 32. The sealing members 26 and 28 will normally be constructed of an elastomeric material such as a rubber or plastic.

The exterior surface of the sealing members 26 and 28 are each to include a metal plate 34 and 36 respectfully. To keep the sealing members 26 and 28 lineally in their desired position, there is mounted on op of the sealing members 26 and 28 a metallic washer 38. This washer 38 includes an enlarged outwardly extending flange 40 which rests on the upper surface sealing members 26 and 28. The washer 38 is snugly mounted within a hole 42 centrally formed within a disc 44. The disc 44 includes a pair of downwardly extending ears 46. Relative to the disc 44, the ears 46 are located diametrically opposite each other. Each ear 46 includes an enlarged opening 48. One opening 48 is to permit a threaded rod 50 to be conducted therethrough into contact with the metal plate 34. The other opening 48 of the other ear 46 is to permit access therethrough of a separate threaded rod 52 which is to come into contact with plate 36. Both threaded rods 50 and 52 are threadably mounted within respective threaded holes 54 and 56 formed within the housing 12.

A tubular nut 58 is located about the threaded rod 50 with the nut 58 being threadably fixedly mounted to the housing 12. In a similar manner, a tubular nut 60 is threadably fixedly secured to the housing 12 and located about the threaded rod 52. It is the function of the tubular nuts 58 and 60 to limit the outward movement of their respective threaded rods 50 and 52. The outer end of each of the threaded rods 50 and 52 are formed into a flattened end 62 which is to facilitate engagement with a wrench or other similar type of tool. Within the flattened end 62 of each threaded rod 50 and 52 is also a located a hole 64. The purpose of the hole 64 is to again facilitate engagement with some type of a tool with the tool functioning to cause rotation of the threaded rods 50 and 52.

Rotation of the threaded rods 50 and 52 in an inward direction (that is, toward each other) will result in pressure being applied against plates 34 and 36. As a result, the sealing members 26 and 28 are moved toward each other and bind against the rod 32. As a result, the sealing members 26 and 28 will function to close, in a fluid tight manner, internal chamber 14 relative to passage 20. This will prevent flow of any liquid from passage 20 into the internal chamber 14. The reason for the closing, in a liquid tight manner, of chamber 14 relative to passage 20 is so that maintenance work can be performed on the structural members mounted within the chamber 14 without fear of any liquid within the passage 20 to be conducted into the chamber 14 and exteriorly thereof into the ambient. Normally, the liquid contained within the passage 20 would be crude oil.

Figure 2:
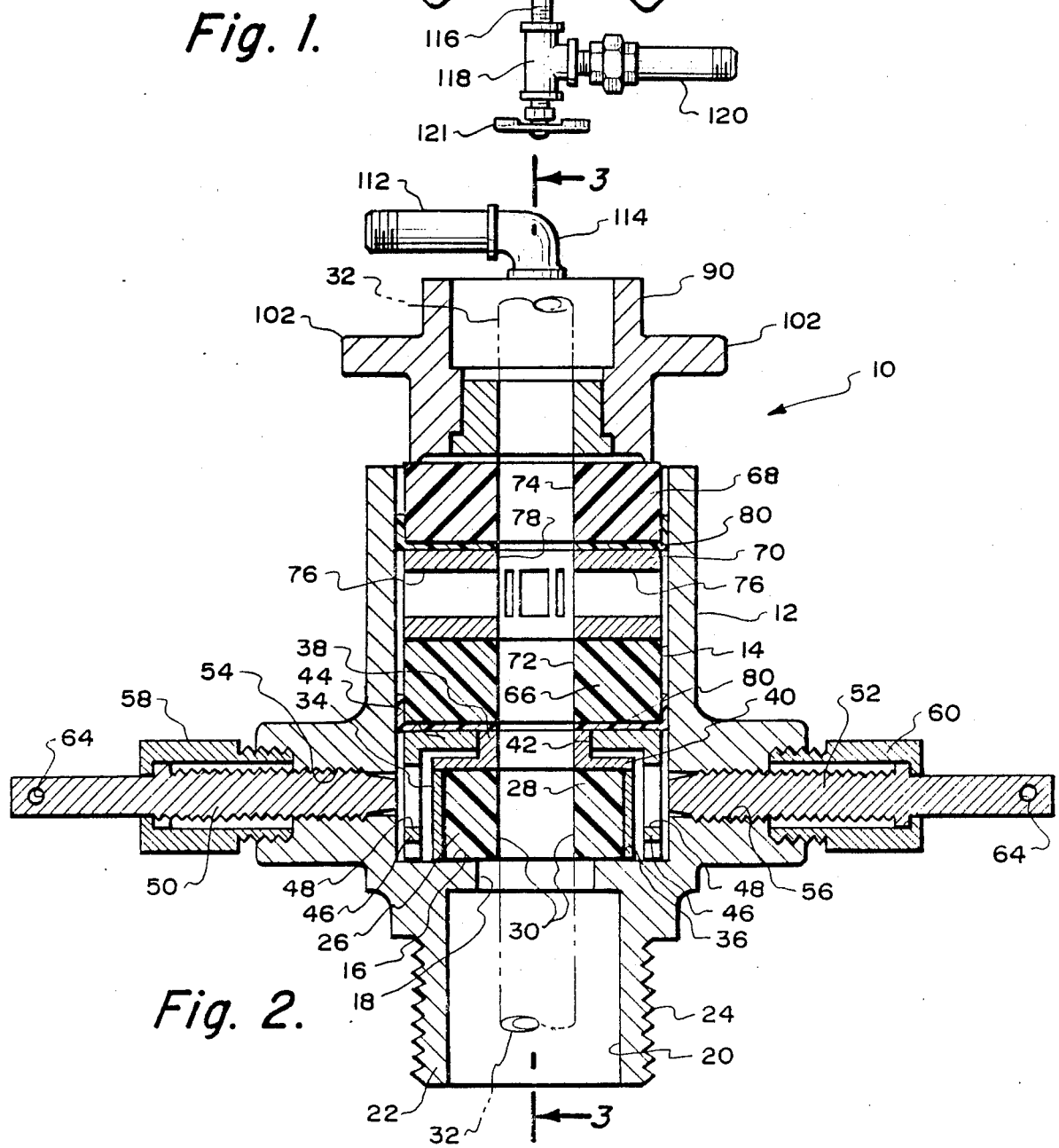
FIG. 2 is a cross-sectional view of the stuffing box of the present invention taken along line 2—2 of FIG. 1.

It is to be understood that during normal operation of the stuffing box 10, the threaded members 50 and 52 will be located in the position shown in FIG. 2 of the drawings. During lineal movement of the rod 32 the preventing of any flow of crude oil from passage 20 into the ambient is prevented by a packing gland assembly which is constructed primarily of a elastomeric discs 66 and 68 and a lantern gland 70. Gland 70 will be normally constructed of a rigid material such as metal.

The disc 66 includes a through opening 72. Disc 68 includes a through opening 74. The openings 72 and 74 form a very close fit with the rod 32 but yet permit lineal movement of the rod 32. The lantern gland 70 defines a plurality of radially disposed openings 76. It can be seen that there are eight in number of the openings 76. These openings 76 all communicate with a through hole 78 which is centrally formed within the lantern gland 70. The rod 32 is to pass through the through opening 78 in a close conforming manner. Lubricating oil from an outside source (not shown) is to be supplied within the radially exposed openings 76 and is to continuously supply the lubricating oil onto the exterior surface of the rod 32. This lubricating oil is to be highly refined and is to minimize the amount of friction that the rod 32 encounters in its movement within the stuffing box 10.

In order to keep the lubricating oil confined within the lantern gland 70 and to prevent the crude oil contained within the passage 20 from mixing with this lubricating oil, there are utilized a pair of thin rubber seals 80. The diameter cross-sectional area of the seals 80 is larger than the area defined by the diameter of the discs 66 and 68. The main body section of one seal 80 is located between the member 44 and the disc 66 with the main body section of the other seal 80 being located between the lantern gland 70 and the disc 68. The periphery of each of the seals 80 is to lay against the surface of the chamber 14 forming a liquid tight seal preventing flow of any of the lubricating oil from the lantern gland 70 past either of the 11 discs 66 or 68. The periphery of each of the seals 80 assumes a right angle configuration relative to the main body section of seals 80.

The lantern gland 70 connects with a standpipe 82. The standpipe 82 includes a hole 84. The lower end of the standpipe 82 is closed defining closed end 86. The upper end of the standpipe 82 is located within a reservoir 88 which is formed within a cover plate 90. A portion of the cover plate 90 covers and abuts against the upper surface of the disc 68. The cover plate 90 includes an enlarged through opening 92. Mounted within a portion of the opening 92 is a nut 94. The nut 94 rests against the upper surface of the disc 68. The nut 94 is held in position by the cover plate 90. The rod 32 passes through the enlarged opening 92 and through nut 94.

It is to be noted that the standpipe 82 is mounted through hole 96 formed within the disc 66. Also, the standpipe 82 passes through hole 98 formed within the disc 68. However, the standpipe 82 forms a tight connection with the hole 96 but the upper end of the standpipe 82 is spaced some distance inward from the sides of the hole 98. Forming the reservoir 88 is a sleeve 100 which snugly engages with the hole 98. The sleeve 100 is integrally connected to the cover plate 90.

The cover plate 90 includes an annular flange 102. Formed within the annular flange 92 are three in number of holes 104. Connected with each hole 104 is a threaded bolt 106. Each threaded bolt 106 connects with a nut 108. Each nut 108 is confined within a small chamber 110 which is formed within the housing 12. The nut 108 is prevented from rotating within the chamber 110.

It can thus be seen that by tightening the bolts 106, pressure is applied against the upper surface of the disc 68. This pressure translates to squeezing to each of the discs 66 and 68. This squeezing motion tends to make smaller the through holes 72 and 74 and apply force against the rod 32. It is to be understood that the holes 72 and 74 wear due to continual motion of the rod 32 and enlarge, these holes can be made smaller by tightening of the bolts 106. The reason for making the holes 72 and 74 smaller is to eliminate liquid leakage exteriorly of the stuffing box 10.

Lubricating fluid from a source (not shown) is to be supplied through pipe 112 to elbow fitting 114. Elbow fitting 114 is threadably secured to cover plate 90 and connects with the reservoir 88. The lubricating fluid is to be continuously supplied under small amount of pressure into the reservoir 88. This lubricating liquid is to be cycled through the lantern gland 70 and to be conducted therefrom through pipe 116, through valve 118, through outlet pipe 120, back to the source (not shown). The valve 118 is to be manually openable and closeable by handle 121.

WHAT IS CLAIMED IS:

1. The combination with a pressurized liquid chamber, a rod located partially within said pressurized liquid chamber and partially within the ambient, said rod being movable, a stuffing box providing a liquid seal between said rod and said pressurized liquid chamber and for providing lubrication of said rod, said stuffing box having a housing, said housing having an internal chamber, said rod passing through said internal chamber, a packing gland assembly mounted within said internal chamber, said packing gland assembly including a pair of deformable discs, pressure applying means mounted on said housing, said pressure applying means for causing deformation of said deformable discs to produce a liquid tight seal about said rod between the ambient and said pressurized liquid chamber, the improvement comprising:
- said packing gland assembly including lubrication means, said lubrication means for applying a lubricating liquid to said rod, said packing gland assembly including a lantern gland located between said deformable discs, said lantern gland having a through opening, said rod being conducted through said through opening, said lantern gland defining a lubricating storage chamber, an opening arrangement formed within said lantern gland, said opening arrangement permitting passage of lubricating fluid from said lubricating storage chamber into direct contact with said rod;
- lubrication fluid fittings mounted on said housing, lubricating fluid from an outside source is to be cycled through said fitting onto said rod; and
- a seal arrangement connected with said packing gland assembly, said seal arrangement to form a liquid tight seal between said lubrication storage chamber and the pressurized liquid chamber and the ambient, said seal arrangement comprising a pair of thin rubber sealing members, said thin rubber sealing members being constructed of sheet material and readily bendable, each said rubber sealing member defining a main body section and a peripheral section, said main body section of each one of said rubber sealing members lying between said lantern gland and each one of said deformable discs, said peripheral section of each said rubber sealing member to lay against the wall surface of said internal chamber and be clamped between the wall surface of said internal chamber and its respective said deformable disc with each said peripheral section assuming a right angled configuration relative to its respective said main body section.

* * * * *